United States Patent [19]
Sato

[11] Patent Number: 6,118,915
[45] Date of Patent: Sep. 12, 2000

[54] HYBRID ASSEMBLY OF BULK OPTICAL ELEMENTS AND METHOD OF MAKING THE SAME

[75] Inventor: Yasushi Sato, Kyotanabe, Japan

[73] Assignee: Kyocera Corporation, Kyoto, Japan

[21] Appl. No.: 09/105,377

[22] Filed: Jun. 26, 1998

[30] Foreign Application Priority Data

Jun. 30, 1997 [JP] Japan .................................. 9-174855

[51] Int. Cl.$^7$ .................................................... G02B 6/26
[52] U.S. Cl. .................................. 385/39; 385/31; 385/73
[58] Field of Search .............................. 385/11, 15, 31, 385/39, 42, 43, 45, 50, 51, 52, 73

[56] References Cited

U.S. PATENT DOCUMENTS

| | | | |
|---|---|---|---|
| 4,958,897 | 9/1990 | Yanagawa et al. | 350/96.15 |
| 5,091,045 | 2/1992 | Froning et al. | 156/633 |
| 5,142,596 | 8/1992 | Mizuuchi et al. | 385/43 |
| 5,706,371 | 1/1998 | Pan | 385/11 |
| 5,815,308 | 9/1998 | Kim et al. | 359/341 |
| 5,940,548 | 8/1999 | Yamada et al. | 385/14 |
| 5,949,928 | 9/1999 | Kadoi et al. | 385/14 |
| 5,978,531 | 11/1999 | Funabashi | 385/45 |

FOREIGN PATENT DOCUMENTS

61-282803 12/1986 Japan .
63-33707 2/1988 Japan .

*Primary Examiner*—John D. Lee
*Assistant Examiner*—Michelle R. Connelly-Cushwa
*Attorney, Agent, or Firm*—Hogan & Hartson LLP

[57] ABSTRACT

An optical device wherein between an end part through which light enters from the outside into the optical device and an end part through which light emerges to the outside of the waveguide core, a slit which crosses the waveguide core and in which an optical element is to be installed is provided, and the core size of said slit is made smaller than those of said incident end and said emergence end.

4 Claims, 6 Drawing Sheets

Prior Art

Prior Art

Fig.8

Prior Art

HYBRID ASSEMBLY OF BULK OPTICAL ELEMENTS AND METHOD OF MAKING THE SAME

FIELD OF THE INVENTION

The present invention relates to hybrid assembly of bulk optical elements that are used in optical communication equipment, optical recording equipment, optical sensors, etc., and laser diodes, optical waveguides, optical fibers, etc., and in particular, an optical device, such as an optical waveguide for hybrid assembly, that can be effectively used in a laser module for optical communication equipment, and a method for producing said optical device.

PRIOR ART

Conventional optical elements include optical isolators, polarizers, various filters and attenuators. Recently, in addition to these conventional bulk type optical elements, many waveguide type optical parts have appeared. However, as the conditions of dimensional tolerance are severe for the formation of waveguides, and also as these parts show a greater dependency on wavelength, many of them have not come to practical use. As a result, bulk type parts are used in mixture with some optical waveguide parts, optical fibers, and optical active elements such as semiconductor laser.

Figure 6:
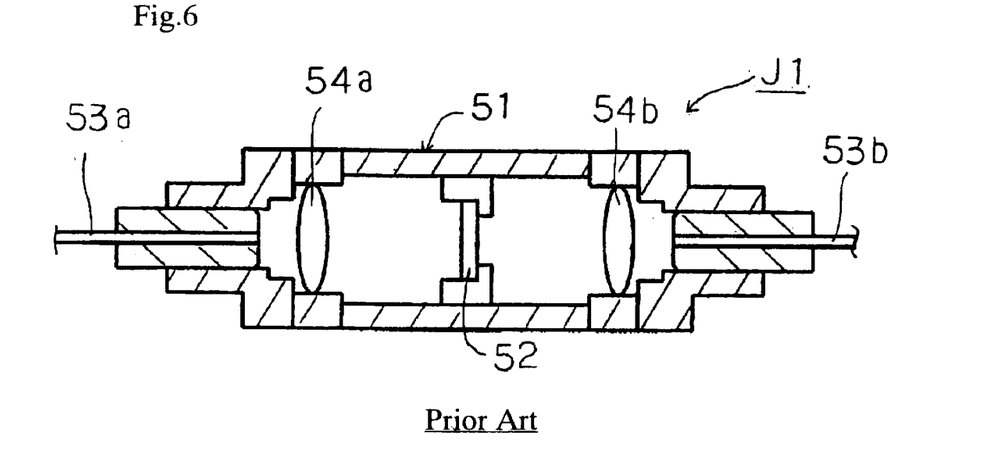
FIG. 6 is a sectional view showing a conventional pigtail type part.

FIG. 6 shows a conventional optical device to which optical fibers are coupled at both ends thereof, and is a sectional view of a pigtail type bulk part J1. As shown in FIG. 6, an optical element 52, such as optical isolator, filter, attenuator and polarizer, is stored in a package 51. A light beam that emerges from an optical fiber 53a is collimated by a lens 54a. Then after passing through the optical element 52, the light beam is condensed by a lens 54b and guided into an optical fiber 53b.

Figures 7A, 7B:
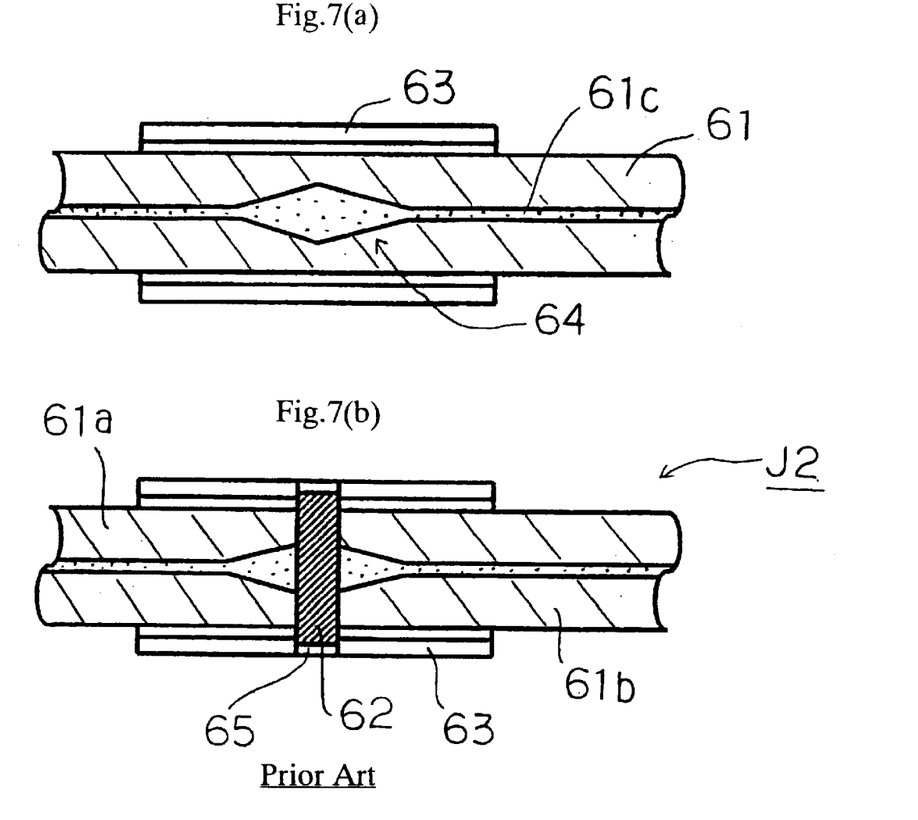

As shown in FIG. 7, an optical device J2 has been proposed as a bulk part similar to that of FIG. 6. In the optical device J2, no lens is used, and mode field sizes at the ends of optical fibers 61a, 61b are expanded to pinch an optical part 62 between them.

This device is made, as shown in FIG. 7 (a), by heating a desired part of an optical fiber 61 to diffuse a dopant such as Ge that is doped in a core 61c of the optical fiber 61; this expands the area of diffusion of the dopant and lowers the difference in refractive index. With this, the mode field size is expanded while the single-mode is maintained. Then the optical fiber 61 is fixed onto a V-grooved substrate 63. After that, a slit 65 is formed by cutting the center of the expanded core part 64 and partly cutting into the V-grooved substrate 63. Then the optical element 62 is inserted.

Figure 8:
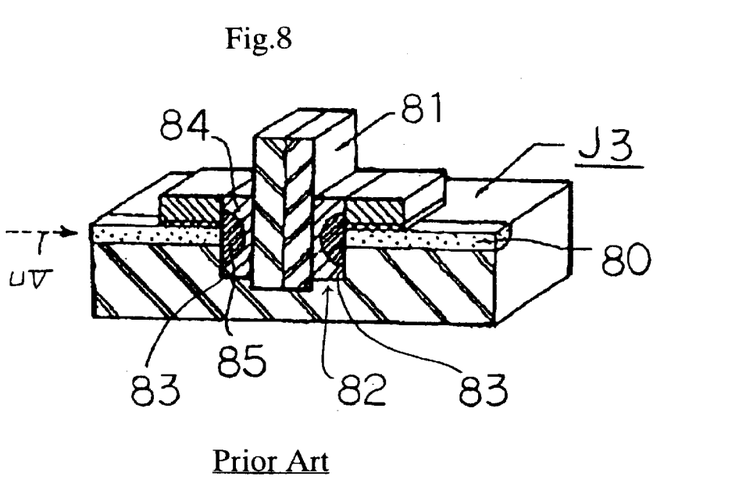
FIG. 8 is a sectional view of a conventional optical isolator, near its slit.

As shown in FIG. 8., an optical isolator J3 has been proposed, that has a configuration in which an slit 82 is made in the middle of a waveguide 80 and a bulk optical element 81 is installed in this slit 82 (for example, Japanese Patent 2586606). The slit 82, that is wider than the width of the optical element 81, is formed. Then the optical element 81 is installed in such a way that gaps are left between the optical element 81 and the exposed ends 83 of the slit 82, and a photo-curing film 84 is filled in each gap, and ultraviolet beams UV are guided through the waveguides, that are adjacent to the respective films, to irradiate the photo-curing films 84.

These photo-curing films 84 are made from, for example, a material in which polymethacrylic acid is used as a parent material to which styrene, benzyl methacrylate, etc. are added. The parent material and styrene or benzyl methacrylate are polymerized in a semi-spherical form by ultraviolet beam that is emitted radially from the waveguide. After that, when the photo-curing film 84 is immersed in methyl alcohol, the unpolymerized additive will be removed. Only the portions that received the light will form semi-spherical lenses 85 that have a greater refractive index.

In the conventional pigtail type parts as shown in FIG. 6, however, positional adjustment of a lens and optical fibers require higher precision, and its assembly takes much time. Moreover, the greater is the optical path length, the greater is the difficulty of adjustment. Hence the thickness of an optical element that can be inserted in the slit and the number of such optical elements that can be inserted in the slit are limited. Further, as each optical element is mounted in a fixing holder before packaging, the number of parts are very large, increasing the costs and the complexity of assembly.

In a fiber with an expanded core as shown in FIG. 7, if the core size of a single-mode optical fiber is increased simply, the higher-order-modes will be excited to degrade the transmission characteristics. It, therefore, is necessary to avoid excitation of higher-order-modes by adjusting the difference in refractive index so that $r \cdot D^{1/2}$ is constant even when the core size is changed. Where r is the core radius, D is the refractive index difference, and $r \cdot D^{1/2}$ is a figure that is proportional to the standardized frequency.

It is difficult to adjust the refractive index in response to a change in the core size. Hence a method of thermally diffusing the dopant of the core of the single-mode optical fiber is used. According to this method, the dopant in the core is made by the heat to diffuse into the clad. Thus the expansion of the core size and the drop in the refractive index take place concurrently to keep $r \cdot D^{1/2}$ at a constant level.

According to this method, optical fibers are not misaligned from each other, however, it is hard to evenly heat the expanded core portion. Hence a long region in the direction of propagation can not be produced. Furthermore, as the expanded core portion is local and short, it is not suited to insertion of a thick element or multiple elements.

The largest problem is that the thermal diffusion process takes much time. For example, to expand a core radius from 4 μm to 20 μm, it will take several tens of hours, although this time varies with a heat source, heating range, temperature, etc. Hence this process is not an inexpensive and easy process of fabrication.

With regard to the method of forming resin lenses as shown in FIG. 8, it is necessary to control the curvatures of the hemispherical lenses 85 according to the size of each gap in the slit in which an optical element is mounted so as to achieve an optimal optical coupling. It, however, is not easy to control the curvatures. Moreover, additional processes are required, such as resin filling, exposure to light and treatment with methyl alcohol, and the number of parts is increased. Further, for some semiconductor laser modules, resins can not be used in the package because release of gas from degrading of the resin or release of gas from the resin over a long period must be avoided.

SUMMARY OF THE INVENTION

The present invention is intended to solve the above-mentioned problems of the prior art and to provide an excellent optical device that can easily accomplish optical coupling of various optical elements with low loss, and a method of producing that device.

To accomplish the above-mentioned tasks, the optical device according to the present invention comprises at least a waveguide core having an incident end for making light beam entering into the optical device and an emergence end for making said light beam emerging from the optical device; and at least a slit for installing an optical element, crossing said waveguide core, and positioned between said incident end and said emergence end, wherein the waveguide core has a variable core size, said light beam has mode field sizes, and core sizes of the waveguide core at positions facing said slit are smaller than core sizes of the waveguide core at said incident end and emergence end, so that a mode field size in said slit is larger than mode field sizes at said incident end and emergence end. The mode field size or the mode field diameter means a width of a light beam at which the light intensity is $1/e^2$ of the peak value.

Preferably, the gap G of said slit satisfies the following formula.

$$G < 0.25 \pi n \, \omega^2/\lambda$$

(where $\lambda$: wavelength of the light beam; n: refractive index of the optical element in the slit; $\omega$: mode field size of the light beam.)

Preferably, the gap G of said slit satisfies the following formula.

$$G < 0.08 \pi n \omega^2/\lambda$$

If the gap G satisfies the formula, The diffraction loss is less than 0.1 dB(the power transmission coefficient is greater than 0.975).

Preferably, an optical element is provided in the slit of said optical device, and at least an optical fiber is provided at the incident end and/or the emergence end of said waveguide core.

Preferably, in the slit of said optical device, a non-reciprocal rotator that non-reciprocally rotates a plane of polarization by a first fixed angle and a reciprocal rotator that reciprocally rotates the plane of polarization by a fixed angle are arranged in series for selectively passing according to polarization modes of the light beam.

As explained above, the present invention has the following excellent effects.

Parts for holding optical elements to ensure optical alignment are not required. Hence the number of parts and the volumes of the parts can be reduced, and in turn, the assembly can be simplified and the overall size of the assembled parts can be reduced.

A single design (product) of this optical device can be used to assemble optical elements of various thicknesses or various number of optical elements. In particular, this optical device is good because it can easily assemble plural optical elements simultaneously. Moreover, the loss due to assembly can be reduced by dividing the assembling positions of the optical elements. The tolerance of the position for forming the slit is very large.

As there is almost no spatial propagation part in the route of light beams, this optical device will hardly change its characteristics even when the environment is changed.

As the core-reducing method is used to expand the mode field size, there is no need of changing the refractive index difference. Hence it is easy to form an expanded mode filed portion.

It is sufficient to slightly modify the conventional linear optical waveguide fabrication process. Any special fabrication equipment, additional member or trouble is not required. This optical device can be produced with ease.

BRIEF DESCRIPTION OF THE DRAWINGS

FIGS. 7 (a) and (b) are sectional views of an expanded core portion of an expanded core fiber for explaining an assembling method with the conventional expanded core fiber.

EMBODIMENT

In the following, with reference to the attached drawings, the embodiment of the present invention will be described in detail.

As shown in FIG. 2 (i), an optical waveguide K according to the present invention is provided with one or more slits 6 cutting across the waveguide core 4 and being designed for mounting an optical element therein, between a incident end 4a and a emergence end 4b of a waveguide core 4. Moreover, the optical waveguide K is provided with reduced core size zones A (each having a tapered part 3 and a minimum core size zone 2) where the core size of the waveguide core 4 is reduced towards the end 6a or 6b of the slit 6. Thus the core size is formed to be minimal at both ends 6a, 6b of the slit 6. Core size means, in the case of the slab waveguide using a thin film waveguide core, the film thickness of the core, and when the core is round, core size means the size thereof. When the core is rectangular in section, core size means the length of the shorter side. When the core is square in section, core size means the length of its side.

Figure 2A:
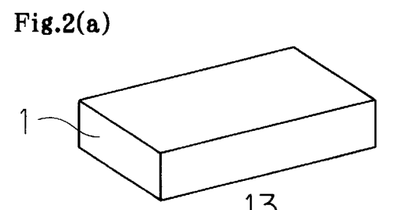
FIGS. 2a–i are the perspective views that schematically explain the fabrication process of an optical waveguide according to the present invention.
Figure 2B:
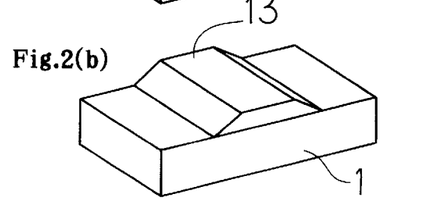
Figure 2C:
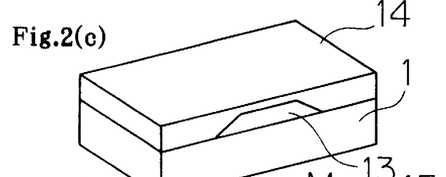
Figure 2D:
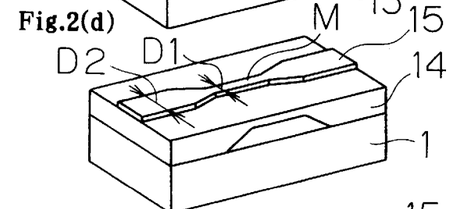
Figure 2E:
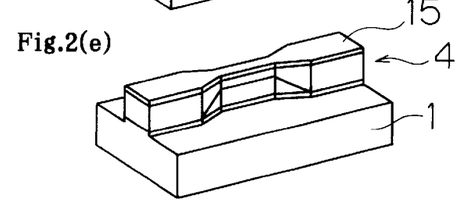
Figure 2F:
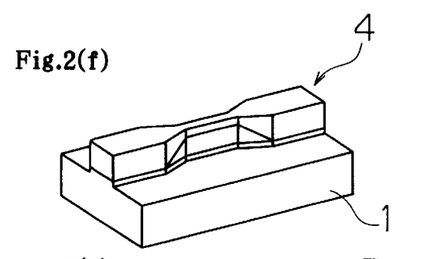
Figure 2G:
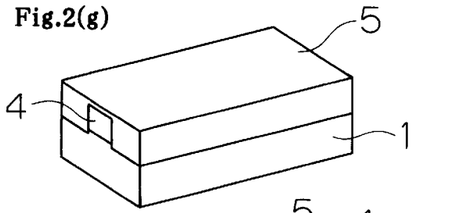
Figure 2H:
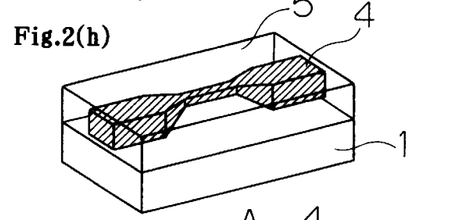
Figure 2I:
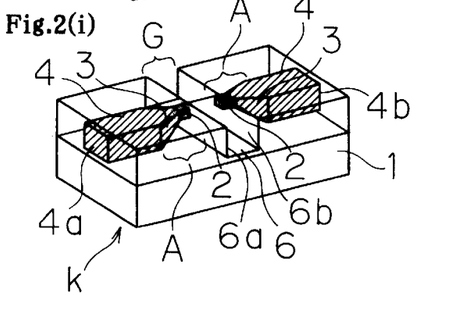

A suitable gap G of the slit 6 is given by $G < 0.25 \pi n \, \omega^2/\lambda$ (where $\lambda$: wavelength of the guided light beam; n: refraction index of an optical element in the slit; and $\omega$: mode field size of the guided light beam). This formula was obtained by, when a gap being filled with a medium of which refractive index is n is present between two waveguide cores 4, computing the gap width at which the power transmission coefficient is greater than 0.794 (the diffraction loss is less than 1 dB).

Preferably, the gap G of said slit satisfies the following formula.

$$G < 0.08 \pi n \omega^2/\lambda$$

If the gap G satisfies the formula, The diffraction loss is less than 0.1 dB(the power transmission coefficient is greater than 0.975).

Generally speaking, when a gap being filled with a medium of which refractive index is present between two waveguides, if the gap width is expressed by G, the power transmission coefficient by T, the wavelength of the guided light beam by λ, and the mode field size by ω, respectively, the following formula holds for them:

$$T(1+((2\lambda G)/(\pi n \omega^2))^2)^{-1}$$

The above-mentioned suitable G was obtained by substituting 0.794 for T of the above-mentioned formula to get $$0.794 < (1+((2\lambda G)/(\pi n \omega^2))^2)^{-}$$

and transforming the formula.

Figure 9:
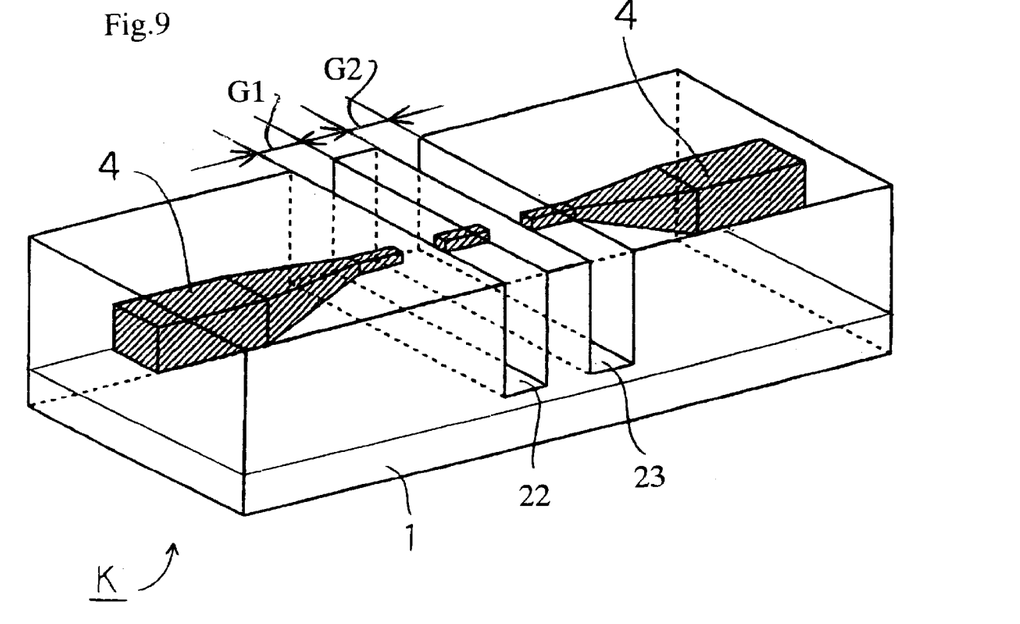
FIG. 9 shows an optical device of an embodiment having two slits.
Figure 10:
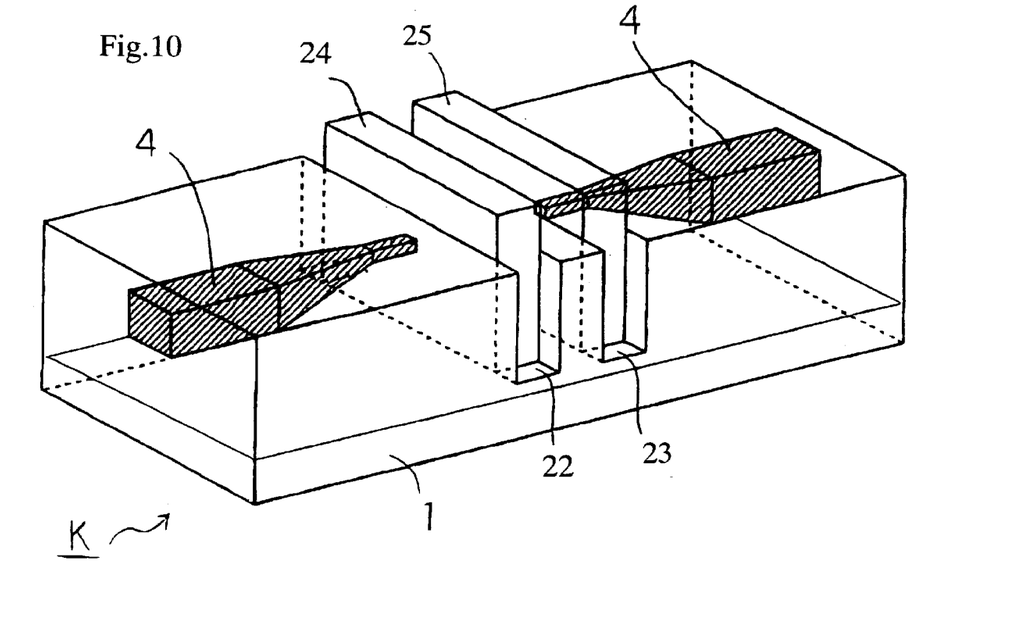
FIG. 10 shows the optical device of FIG. 9, with optical elements mounted in the slits.

As shown in FIG. 9, plural slits, for example, slits 22, 23 can be provided, and as shown in FIG. 10, optical elements 24, 25 can be mounted in the slits 22, 23, respectively. This is good because the resulting diffraction loss is smaller than that of a case where optical elements are mounted in one slit of which gap is equivalent to the total (=G1+G2) of the gaps of the above-mentioned plural slits. The reason for this is as follows. As clearly shown in the graph of FIG. 4, when the gap length gets larger, the diffraction loss increases rapidly. When plural gaps of a smaller length are provided, the total coupling loss of these smaller gaps can be reduced lower than that of a single larger gap.

Next, the method of fabricating this optical waveguide K will be described. First, as shown in FIG. 2. (a) and (b), on a substrate 1 of, for example, quartz (SiO2), etc., a film is formed in the form of a trapezoid by a film forming method such as the CVD method to form a taper clad 13 of a desired thickness (for example, about 7.5 μm thick) as a sub-clad layer. This can be done rather easily by lifting the mask from the substrate 1 by several tens of micrometers to several hundreds of micrometers and forming a film. The degree of tapering is controlled by the distance of the lift.

Next, as shown in FIG. 2 (c), a waveguide layer 14, of which specific refraction is raised about 0.3% higher than that of SiO2 by doping SiO2 with, for example, Ge, etc., is formed by, for example, the CVD method so that the thickness of the layer 14 is 8 μm from the substrate 1 and the thickness of the layer 14 is 0.5 μm from the taper clad 13.

Next, as shown in FIG. 2 (d), a mask is formed on the waveguide layer 14. The width D1 of the expanded mode field part M is reduced to 0.5 μm, and the width D2 at both ends is 8 μm.

Next, as shown in FIG. 2 (e), both sides of the waveguide is removed by reactive ion etching (RIE) to form a waveguide core 4. Then, as shown in FIG. 2 (f), the mask 15 is removed.

Next, as shown in FIG. 2 (g), the waveguide core 4 is covered by a main clad layer 5 of SiO2 having the same refractive index as the substrate 1 and the taper clad 14. FIG. 2 (h) shows the waveguide core 4 seen through the main clad layer 5.

Finally, as shown in FIG. 2 (i), a slit 6 for fixing an optical element therein is cut by, for example, a dicing saw.

When the above-mentioned fabrication method is compared with the method for fabricating a conventional straight (linear) waveguide, the differences are just the steps of FIG. 2 (b) and (d). Thus this waveguide K can be fabricated by slightly modifying the conventional fabrication procedure.

In FIG. 2 (b), a step of forming the taper clad 13 is added. This step, however, can be made on the same equipment for other film forming steps (for example, a CVD system). No extra piece of equipment is required, and no extra trouble of setting, etc. is required. And the increase in the fabrication time is minimal. Moreover, the difference between the step of FIG. 2 (d) and that for a straight waveguide is only that the mask pattern is different. Thus these differences do not complicate the entire procedure at all.

Figure 4:
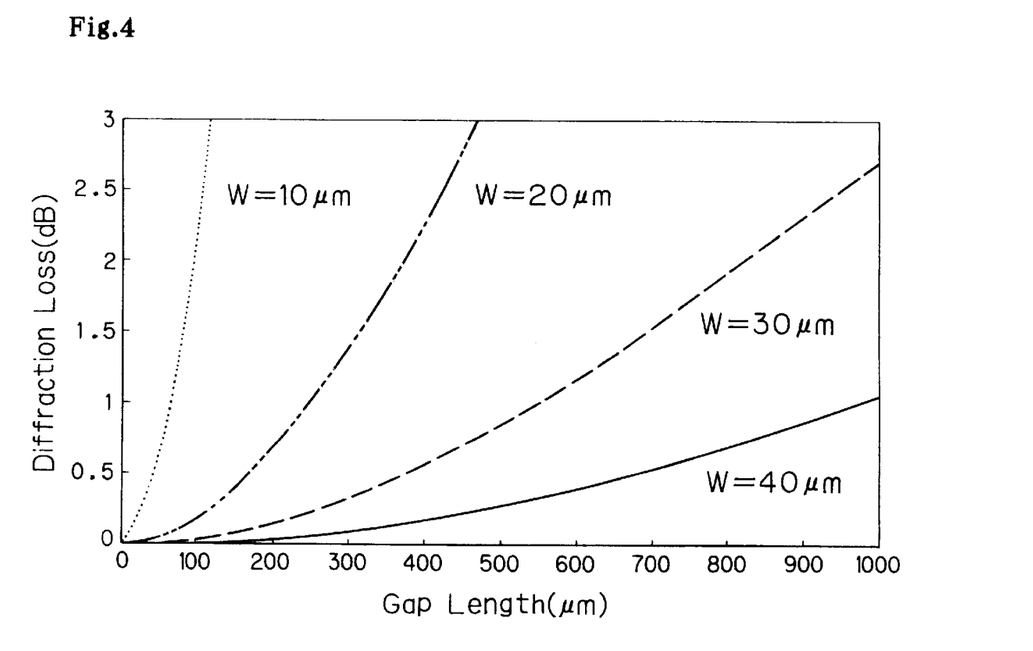
FIG. 4 is a graph indicating the relationship of mode field size, gap length and diffraction loss.

Next, the coupling efficiency of light beam when two waveguides are opposed to each other with a gap between them is shown in FIG. 4. The axis of abscissa indicates the gap length between two waveguides. This corresponds, in the present invention, to the gap G of the slit 6. The axis of ordinate indicates the loss of light. The mode field is assumed to have a Gaussian distribution. The wavelength is 1.31 μm, and the refractive index in the slit is that of air (n=1). The dashed line indicates the case of a waveguide of which mode field size W is 10 μm. This line indicates that when the gap length (the gap of the slit 6) is 300 μm, the loss is 8 dB or greater. When the mode field size is expanded to 40 μm (the full line), even when the gap length is 300 μm, the loss of light is reduced to about 0.1 dB.

Figure 5:
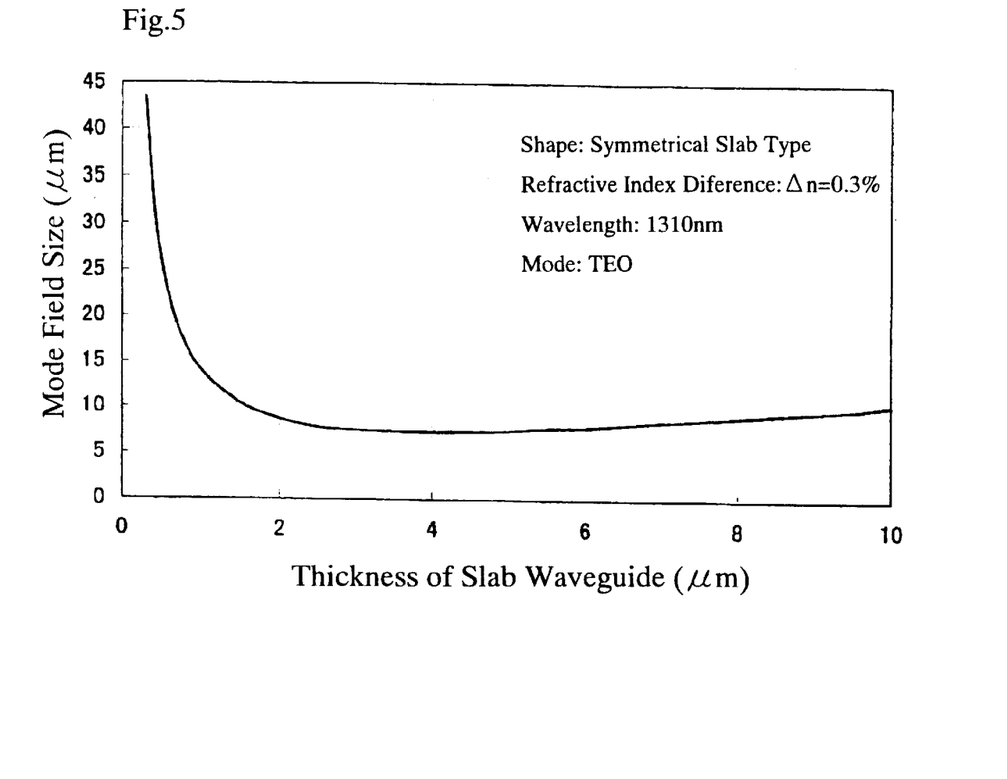
FIG. 5 is a graph indicating the relationship between waveguide layer thickness and mode field size of the slab waveguide.

FIG. 5 shows the relationship between the thickness of the waveguide layer (corresponding to the core size) and the mode field size of the slab waveguide. This is intended to suggest the relationship between the core size and the mode field size. As clearly seen in FIG. 5, when the waveguide layer thickness increases, the mode field size increases. However, with the thickness of about 4 μm as a turning point, when the waveguide layer thickness decreases, the mode field size increases. If the refractive index difference does not change, when the core size increases, higher-order-modes will be generated to degrade the transmission characteristics. However, when the waveguide core is reduced in size, higher-order-modes will not be generated. Hence there is no need of changing the refractive index difference.

Such a proposal of hybrid assembly has not been made to the present, that two guidewaves of which waveguide cores are reduced in size are opposed to each other to realize a coupling of low loss. As the length of the expanded mode field part including the bulk assembly parts (=two minimal core parts 2+the zone G) can be designed freely, a plural number of bulk optical elements of any thickness and optical fibers or optical active elements can be coupled easily. The expanded mode field part may be fabricated to have a length exceeding several millimeters. Then the optical device can be used as a general-purpose one even when the number and thickness of elements to be inserted are not determined in advance.

In the above-mentioned assembly structure, a bulk non-reciprocal polarizing rotator and a bulk reciprocal rotator are mounted in the groove for mounting elements. Around this center groove, there are regions of reducing core size. On the outside of these reducing core size regions, a thin film of a metal or an anisotropic dielectric or a composite thin film of a metal and a dielectric is formed to produce waveguide mode splitters. In this way, a surface mount type optical isolator is produced. With this method, a surface mount type optical isolator having a smaller insertion loss can be made easily.

In the following specific embodiments will be described.

Example 1

Figure 1:
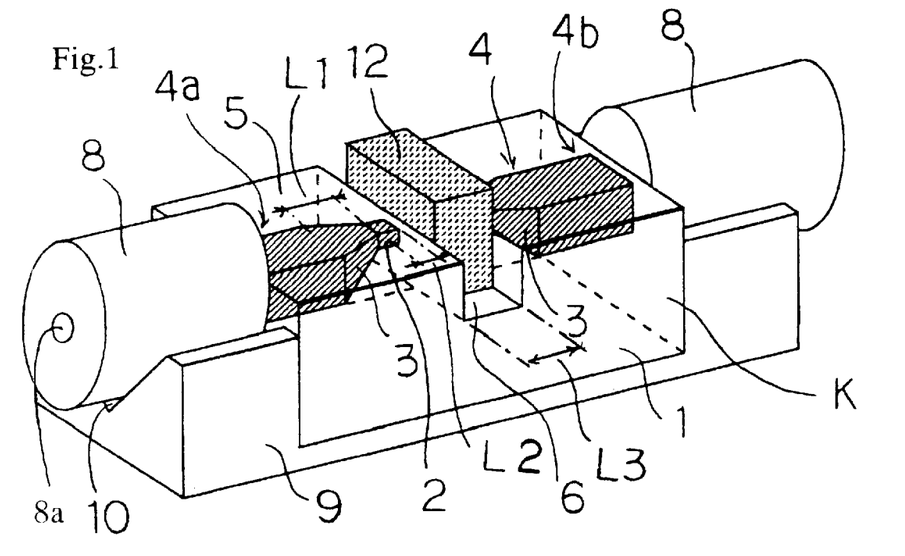
FIG. 1 is a perspective view of an optical waveguide and an optical device for surface mounting according to the present invention.

FIG. 1 is a perspective view of an optical device wherein optical fibers 8 are optically coupled with a incident end 4a and a emergence end 4b of an optical waveguide K, respectively. 8a is a fiber core. As shown in FIG. 1, a core is formed in the desired configuration over the entire length, 15 mm, of a quartz substrate 1 by the CVD method and the etching method: The expanded mode field part has a core of substantially square in section and its core size is 0.5 μm. The length of this expanded mode field part is 2.5 mm (the gap L3 of the slit 6: 0.5 mm; and the length L2 of each minimal core size part 2: 1 mm). On both sides of the expanded mode field part, there is a tapered parts 3 (length L1) of 5 mm long.

Both the incident end 4a and the emergence end 4b are 6.25 mm long, their cores are substantially square in section and the core size is 8 μm. The refractive index difference between the waveguide core 4 and the quartz substrate 1 is 0.3%, and the refraction index of the core does not change throughout the core. A quartz clad layer 5 is formed over them. The expanded mode field part of which core size is 0.5 μm has a mode field size of about 30 μm. The mode field sizes of the incident end 4a and the emergence end 4b are about 10 μm. Optical fibers 8 are connected by butt coupling to the incident end 4a and the emergence end 4b. 9 is a V-grooved substrate for aligning and fixing the surface mount type waveguide 7 and the optical fibers 8. It has a V-shaped groove 10 for positioning and holding the fibers.

In the expanded mode field part, a slit 6 of which gap is about 500 μm is cut out by a dicing saw. A wavelength filter 12, that is comprised of multiple film layers of dielectrics, is inserted and fixed in this slit 6. For the multiple layer films, for example, a combination of ZnS and MgF2 or a combination of TiO2 and SiO2 is used.

The incident light to the incident end 4a and the light coming out of the emergence end 4b were measured to determine the loss of light. The diffraction loss at the gap of 500 μm was about 0.85 dB at the wavelength of 1.31 μm.

The wavelength filter may be fixed by soldering, etc. In that case, both faces of the wavelength filter must be coated with an anti-reflection coating for air, and air gaps must be provided. Both faces of the wavelength filter 12 may be coated with an anti-reflection coating for adhesive, and the remaining gaps after the insertion of the wavelength filter 12 may be filled with a photo-curing resin such as a heat-setting epoxy adhesive of which refractive index is adjusted (refractive index is about 1.6). Although not illustrated in FIG. 1, the entire assembly is eventually sealed in a package for enhanced reliability.

Example 2

Figure 3:
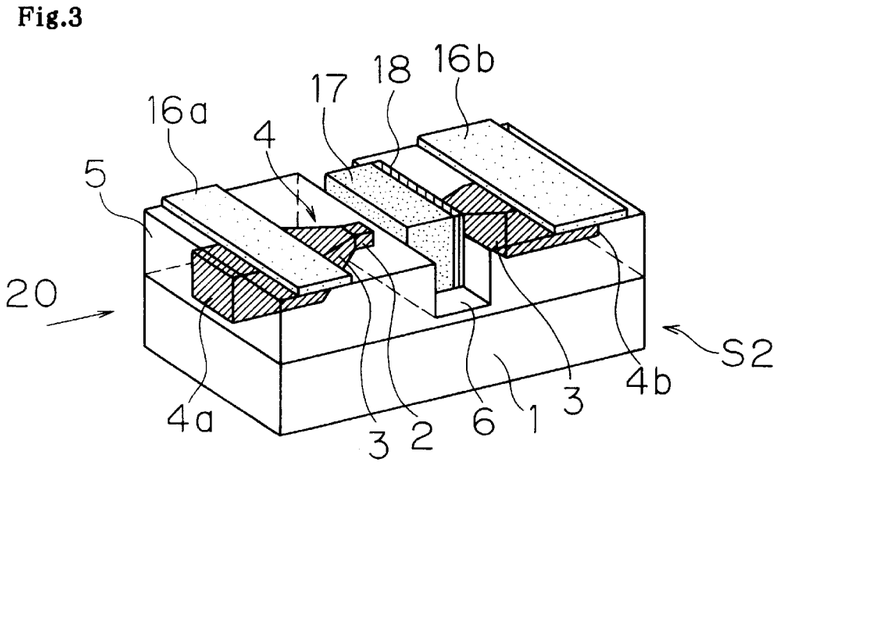
FIG. 3 is a perspective view of an optical isolator according to the present invention.

FIG. 3 shows an optical isolator S2 that uses the assembly structure according to the present invention.

A substrate 1 and a clad 5 are made of fused quartz. A waveguide core is made of fuzed quartz that is doped with Ge, etc. to raise the refractive index by 0.3%. The core size of the expanded mode field part is 0.5 μm, and the mode field size is about 30 μm. The core size of the incident end 4a and the emergence end 4b is 8 μm, and the mode field size is about 10 μAm.

Thin films of Al are formed on the core 4 to surround the slit 6 in which an optical element is mounted; thus a first polarization mode splitter 16a and a second polarization mode splitter 16b are formed.

In the slit 6, a non-reciprocal polarizing rotator 17, that is a piece of magnetic garnet of about 400 μm thick, and a reciprocal polarizing rotator, that is a piece of quartz of 90 μm thick, are arranged in series.

The axis C of the quartz is set at an angle of 22.5 degrees with the horizontal plane. The non-reciprocal polarizing rotator made of magnetic garnet, etc. is sometimes called Farady rotator, and the reciprocal polarizing rotator made of a birefringence material such as quartz is sometimes called a half-wave plate.

Next, the operation of this surface mount type optical isolator will be described. Here, the clockwise direction when one sees in the direction from the incident end 4a towards the emergence end 4b is defined as the plus (+) rotation, and the opposite one as the minus (−) rotation.

The incident light 20 to the incident end 4a is changed to TE-polarized light by the second polarization mode splitter 16b, and the plane of polarization is rotated by −45 degrees by the reciprocal polarizing rotator 18, then the polarized light is turned by −45 degrees by the non-reciprocal polarizing rotator 17 to become the TM-polarized light. This light is removed by the first polarization mode splitter 16a.

This surface mount type optical isolator S2 easily exhibited excellent characteristics; the insertion loss was 1 dB or under, and the isolation was 36 dB or over.

The substrate 1 may be made of, in addition to fused quartz, polymers, other optical glasses or semiconductors. As for the polarization mode splitters, in addition to those of Al, there are other forms: Thin films of metals such as Cu and Ag may be formed to absorb TM-polarized light. Quartz or rutile may be mounted to use the anisotropy of refractive index to radiate one mode of the pair. A waveguide brancher may be used to change the propagation constant to branch the light beam into two modes. It, therefore, is possible, in contrast to the embodiment, to remove the TE-polarized light and transmit only the TM-polarized light.

Moreover, it is possible to provide plural slits 6 to mount both an optical isolator and a filter or two optical isolators at the same time. For example, the graph of FIG. 4 shows that when two optical elements, 300 μm thick each, are to be inserted in a waveguide, if one groove of 600 μm is formed in an expanded mode field part having a mode field size of 30 μm, the diffraction loss is 1.17 dB, and if two grooves of 300 μm each are formed, the total diffraction loss is just 0.64 dB. In other words, even when the total of the optical path length is the same, if elements can be mounted separately, the loss due to mounting of these elements can be reduced. This is a significant merit that can not be realized by lenses.

What is claimed is:

1. An optical device comprising:

a waveguide core having a input end for a light beam to enter the waveguide core and an output end for the light beam to exit the waveguide core; and at least one slit intercepting the waveguide core between the input end and the output end for installing an optical element, wherein the waveguide core has a variable core size that is smaller at positions where the slit intercepts the waveguide core than at the input end and the output end;

wherein a mode field size of the light beam in the slit is larger than mode field sizes of the light beam at the input end and output end of the waveguide core, and wherein a gap G of said slit satisfies the following formula:

$$G < 0.25\, \pi n \omega^2 / \lambda$$

where λ: is a wavelength of the light beam, n is a refractive index of the optical element in the slit and ω is the mode field size of the light beam in the slit.

2. An optical device of claim 1 being characterized in that at least an optical element is provided in the slit of said optical device, and at least an optical fiber is provided at the incident end and/or the emergence end of said waveguide core.

3. An optical device of claim 1 being characterized in that in the slit of said optical device, a non-reciprocal rotator that non-reciprocally rotates a plane of polarization of the light beam by a first fixed angle and a reciprocal rotator that reciprocally rotates the plane of polarization by a second fixed angle are arranged in series for selectively passing according to polarization modes of the light beam.

4. A method of fabricating an optical device comprising:

forming a trapezoid sub-clad layer on a center of a substrate;

forming a waveguide core layer, covering said sub-clad layer, on said substrate;

forming a main clad layer on said waveguide core layer; and forming at least one slit for installing an optical element, the slit intercepting said waveguide core layer, wherein a gap G of said slit satisfies the following formula:

$$G < 0.25\, \pi n \omega^2 / \lambda$$

where $\lambda$ is a wavelength of the light beam, n is a refractive index of the optical element in the slit and $\omega$ is a mode field size of the light beam in the slit.

* * * * *